3,420,453
DAMP GRINDING FOR AGGLOMERATION
Yoshinosuke Tada, Nagoya, Syoji Mizuno, Chita-machi, Chita-gun, and Syunsaku Kashima, Seiichi Yasui, and Taku Sugiura, Nagoya, Japan, assignors to Yahagi Seitetsu Kabushiki Kaisha, Nagoya, Japan, a corporation of Japan
Filed Apr. 6, 1966, Ser. No. 540,559
U.S. Cl. 241—15                                  6 Claims
Int. Cl. B01f *3/00*

ABSTRACT OF THE DISCLOSURE

A damp grinding process for the agglomeration of raw materials containing water and/or other liquids, characterized by the fact that various industrial raw materials, or their mixtures with additives, particularly iron ores, such as pyrite cinder, are mixed, ground and kneaded in a damp grinding mill provided with peripheral discharge openings, the pulverizing medium of which is selected from the group consisting of balls, rods and pebbles, in a damp state, and then directly agglomerated as they are, or with the addition of a small amount of water.

---

This invention relates to an improved process for producing agglomerates such as pellets, briquettes or the like, from various raw materials, such as pyrite cinder, fine iron or non-ferrous ore wherein the ore is pulverized or ground and, if necessary, then mixed with additives and/or binders, with the water content being appropriately controlled. According to the present invention, agglomerates having excellent properties can be produced very efficiently with very simple equipment and steps as compared with other well known processes.

The usual agglomerating processes, such as pelletizing, briquetting or the like, can be roughly divided into a first step of grinding wherein raw material is pulverized in wet or dry condition, a second step of mixing while controlling the moisture content wherein the ground material is mixed after having been dewatered or after having water added and a third step of agglomerating wherein agglomerates are formed. In some cases, before or during the agglomerating step, additional raw materials, binders, additives, exothermic substances and other reactional or auxiliary materials (hereinafter, abbreviated to additives or the like) are admixed and then drying, as well as adjusting of the ambient atmosphere, is performed to accelerate agglomeration. The resulting agglomerates containing appropriate amounts of water and/or other liquids (for instance, about 7 to 23% water in the case of iron ore) are subjected to such treatments, as drying, calcinating, roasting, baking and/or various other operations to obtain the finished products.

Apart from particular cases where grain sizes and characteristics of the raw materials are important, for agglomerating with the mere addition of water, additives or the like and mixing, the outline of processes for producing agglomerates now generally and actually practiced in industry is as referred to in the above-mentioned example. The characteristic features of the products, productive efficiency, equipment and manufacturing costs are considerably affected by the types of grinding, mixing and other treating methods.

Figure 1:
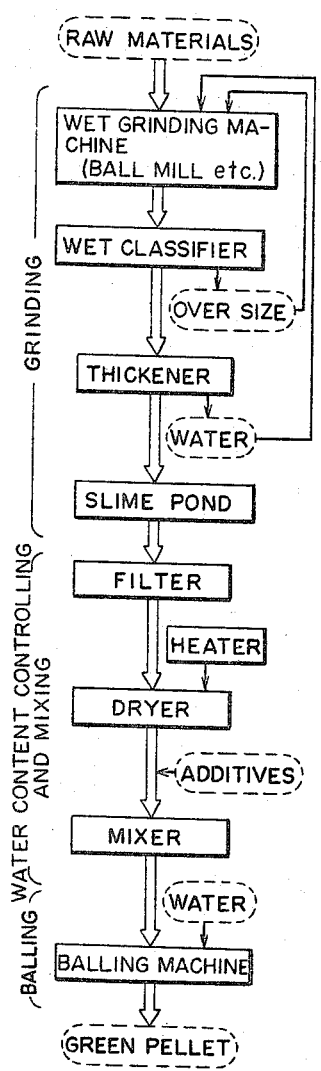
Figure 2:
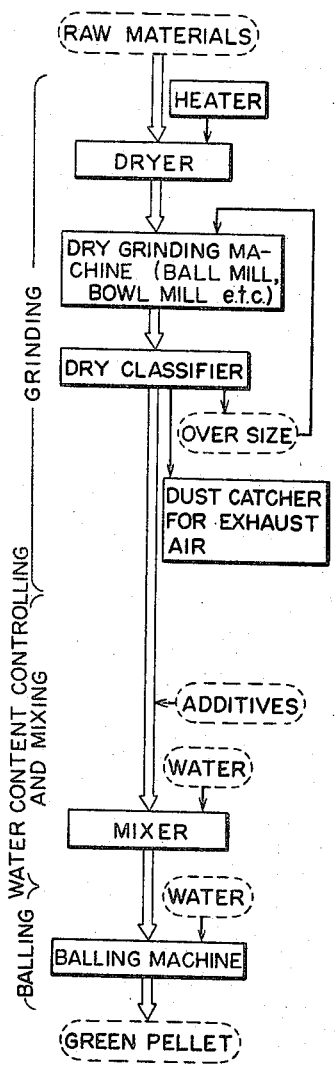
Figure 3:
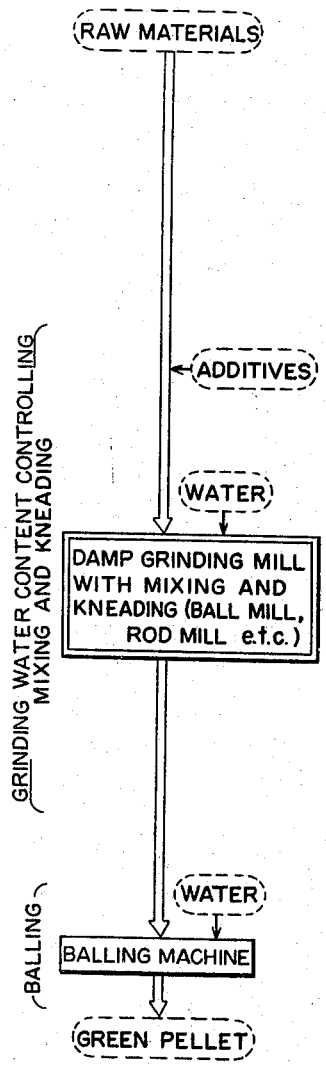

The present invention will be explained in more detail, not exclusively but merely illustratively in contrast with the usual methods, with reference to the accompanying drawing, in which:

FIGS. 1 and 2 illustrate the usual agglomerating process for the manufacture of green pellets, i.e., moist pellets obtained through the grinding treatment respectively under both wet and dry conditions, and FIG. 3 shows one example of an application of the present invention to an agglomerating process for producing green pellets.

In the steps of manufacturing green pellets in the case of the wet grinding method of FIG. 1, the single or mixed raw material to which a large amount of water (more than about 25%, although it is varied depending upon materials to be treated, and over approximately 30% in the case of fine pyrite cinder) has been added to give it fluidity as a slurry, is ground, for instance, in a wet grinding machine such as a ball mill or tower mill. The slurry, after grinding, is usually classified, depending on the respective predetermined size limits, by means of a wet classifying apparatus, and oversize particles are recirculated to the grinding machine. The slurry, ground to less than the predetermined size, is dewatered by a filter, for instance, a vacuum filter, after it is condensed in a thickener. When there is excess water content in the resulting so-called coke, it is necessary to undertake further troublesome treatments to dry to the appropriate water content. After addition of the required additives, followed by mixing and kneading of the resulting mixture, green pellets can finally be manufactured in a balling machine.

As seen in the above-mentioned example, the wet grinding method may be said to be most suitable for microfine grinding followed by a wet treatment, such a floatation dressing. However, loss of finely ground raw materials and of soluble useful components, if present, is caused due to dewatering in a later step of the treatment which is necessary for removing an excess amount of water which has been added during the grinding step, especially in the balling of green pellets as in the present invention or in similar cases. In particular, when extremely minute pulverized material is accumulated, dewatering or filtering is difficult. Moreover, for the same reason, as it is irrational to add minute fine powder or soluble additives during the grinding step, those materials must be added after the dewatering or drying steps and thereafter, mixing or kneading must be performed in specialized equipment additionally provided for that purpose.

In the grinding method in the dry condition as shown in FIG. 2, the water content of the raw material to be treated should be chosen usually so as to be less than several percent, although it may vary depending upon the properties of the raw materials, more particularly the intended sizes of the materials and the kind of grinding machine. However, as raw materials generally contain a certain amount of water, a drying step is often required before grinding, particularly in a case of fine pulverization. The reason why raw material is treated after it is dried is that when a ball mill or the like is used for grinding, any increase in the water content causes clogging with the grinding material, i.e., so called choking phenomenon which not only renders dry classification difficult, but also sometimes stops the grinding operation.

The dry grinding method is suitable only in manufacturing dry powders. Since pulverized raw materials are liable to generate dust which is scattered around in the course of grinding, it is important to collect and recover this dust. Therefore, the equipment and steps of operation become complicated.

In the case of agglomeration as in the present invention, where the appropriate water content should be obtained by adding a suitable amount of water, after addition of the additives or the like, and simultaneously, mixing should be performed in special equipment provided in order to attain sufficient mixing, such dry grinding method is technically and economically undesirable.

In the foregoing, the balling processes including the grinding steps in both wet and dry conditions have been respectively outlined, but there are compromise processes between these two methods and other processes.

As stated above, referring to the usual processes for manufacturing green pellets through either of the wet or dry grinding methods, the former requires a particular dewatering or drying device and further a mixer, while the latter requires, in addition to the dryer or the like, a particular dust catcher and mixer, etc.

A suitable amount of water in the green pellets may vary depending on the kind, grain size, characteristics of the materials and purpose or use. For instance, green pellets of iron ores usually contain water ranging from 7 to 23% and can be manufactured by agglomerating the material in a damp state or "damp material" with such water content that makes it incapable of being submitted in situ to a dry or wet grinding method, unless the water content is appropriately modified. Hereinafter, the raw materials with such water content are simply called "damp materials."

The process according to the present invention is characterized in by the fact that such damp materials are ground as they are in damp state without resorting to the wet or dry grinding in which troublesome operations are required, thereby permitting the grinding, water controlling, mixing and kneading steps to be carried out simultaneously as seen in FIG. 3. Hereinafter such a process is simply called "damp grinding." Accordingly, as is apparent from comparison of the diagrams given in FIGS. 1 to 3, the process of the present invention shows remarkable effects and advantages in simplifying the equipment and operations. In addition, the process of the present invention is very economical in comparison with other usual processes, particularly for treating damp materials of relatively fine powder, though extremely efficient grinding would not be easily expected. In addition, excellent balling characteristics can be imparted to the raw material as explained later.

As for grinding methods for various raw materials, both the wet or dry method has been usually practiced and it is considered to be extremely difficult to industrially grind large amounts of relatively fine materials in a damp state because of the choking phenomenon. This is not true when grinding relatively coarse materials or in other extremely special cases. In particular, as to the adoption of the damp grinding method for agglomerating green pellets or the like as in the present invention, there has been neither an attempt nor an industrial utilization, except cases where merely simple mixing or kneading is intended.

The present invention was achieved while conducting a series of studies and experiments in grinding, mixing, kneading and pelletizing, particularly with respect to iron pyrite cinders in a damp state, in an attempt to develop the most effective techniques of agglomeration. As the result, in contrast with traditional and general ideas in this field, it has been found that grinding, mixing and kneading of iron ores such as fine pyrite cinders can be sufficiently performed in a damp state, for instance, particularly by means of peripheral discharge type rod mill, ball mill or the like machines, and that balling characteristics of materials can be remarkably improved.

In the following discussion, some practical results of the experiments and industrial operations will be described.

I. EXAMPLES OF EXPERIMENTAL RESULTS

1-1 Outline of experimental equipment (1) Damp grinding test machine

Rod mill:
 Type—End peripheral discharge type.
 Size of drum—910 mm. dia. x 1,520 mm.
 Revolution—34 r.p.m.
 Discharge openings—100 mm. dia. x 5.
 Electric motor—19 kw.

N.B. This machine was converted to ball mill by providing grates at the discharge openings in case of ball mill test.

Auxiliary equipment.—Belt conveyor, transport weight meter, a screw feeder for charging, etc.

(2) Agglomerating test machine

Balling drum:
 Type—Short drum type.
 Size of drum—500 mm. dia. x 270.5 mm.
 Revolution—14.4–56.0 r.p.m. variable.
 Test revolution—22 r.p.m.

Auxiliary equipment.—Spray device for water addition, etc.

1-2 Raw material

Damp materials from several types of iron pyrite cinders and iron ores mixed with bentonite and water.

(1) Example of chemical analysis

|  | Total |
|---|---|
| Fe | 59.12 |
| FeO | 13.41 |
| $SiO_2$ | 9.87 |
| $Al_2O_3$ | 0.85 |
| MgO | 0.62 |
| CaO | 0.32 |
| Cu | 0.29 |
| S | 0.98 |
| P | 0.01 |

(2) Example of size analysis, water content, bulk density, specific surface area Size analysis:
 +200 _____ mesh percent__ 25.5
 200–270 _____ do____ 12.0
 270–325 _____ do____ 7.5
 −325 _____ do____ 55.0
 Water content _____ percent__ 18.2
 Bulk density _____ g./cm.$^3$__ 1.10
 Specific surface _____ cm.$^2$/g__ 2748

1-3 Procedure and results of experiments (1) Grinding test of mills

With varying the feed rate of the above-mentioned damp raw material, the size and filling amount of balls or rods in the ball mill or rod mill, various grinding tests were effected.

In the ball mill test, through the feed rate of raw materials, the size and filling amount of balls, and the revolutional speed were varied widely, the raw materials, the stickiness of which increased as the treatment in the mill proceeded, were adapted to be deposited and growth occurred which resulted in choking as time elapsed. In the present testing machine, working could not be continued further.

In spite of the above-mentioned result of the ball mill test and general technical conception, in the experiment of the rod mill no objection whatever occurred and continuous working could be performed.

(2) Grinding and agglomerating test of the rod mill process

The raw material thus ground and kneaded with varying conditions in the testing rod mill was further adjusted at various water contents and then agglomerating tests were performed systematically by the balling drum. From many results, several typical examples have been selected and shown in Table 1.

TABLE 1.—TYPICAL RESULTS OF DAMP GRINDING AND AGGLOMERATING TEST OF IRON PYRITE CINDER

GRINDING TEST (TYPICAL EXAMPLES)

| Test | Material Untreat. | R-6 | R-3 | R-8 | R-7 | Remarks |
|---|---|---|---|---|---|---|
| Water content of raw material, percent | 18.2 | 18.0–18.6 | 18.9–19.1 | 18.6–19.0 | 18.8–19.6 | |
| Rods filled: | | | | | | |
| Number of pieces: | | | | | | |
| 75 mm.$\phi$ x 1,400 mm | | 20 | 10 | 20 | 20 | |
| 65 mm.$\phi$ x 1,400 mm | | 1 | | 15 | 15 | All tests showed no choking. |
| 50 mm.$\phi$ x 1,400 mm | | 1 | | 2 | 2 | |
| Total weight, kg | | 961.8 | 473.2 | 1,441.2 | 1,441.2 | |
| Filling ratio to mill volume, percent | | 22.9 | 11.3 | 34.3 | 34.3 | |
| Feed rate of raw material, t./hr | | 2.04 | 0.56 | 1.92 | 1.51 | |
| Treated raw material: | | | | | | |
| Bulk density, g./cm.$^3$ | 1.10 | 1.31 | 1.38 | 1.51 | 1.64 | Soft charge in 6.41-liter receptacle. |
| Size distribution: | | | | | | |
| +200 mesh | 25.5 | 21.5 | 20.5 | 18.0 | 17.0 | |
| 200–270 mesh | 12.0 | 11.0 | 11.0 | 9.0 | 9.5 | Wet screening method. |
| 270–325 mesh | 7.5 | 4.5 | 4.5 | 6.0 | 4.5 | |
| −325 mesh | 55.0 | 63.0 | 64.0 | 67.0 | 69.0 | |
| Specific surface area, cm.$^2$/g | 2,748 | 3,759 | 4,098 | 4,363 | 4,571 | Air penetration method. |

PELLETIZING TEST (TYPICAL EXAMPLES)

| Test | Material Untreat. | R-6 | R-3 | R-8 | R-7 | Remarks |
|---|---|---|---|---|---|---|
| Moisture content at balling, percent | 22.8 | 19.2 | 18.8 | 17.3 | 17.5 | |
| Charging weight, kg | 5 | 5 | 5 | 5 | 5 | |
| Green pellets: | | | | | | |
| Average diameter, mm.: | | | | | | |
| Balling time— | | | | | | |
| 4 minutes | 3.6 | 5.5 | 6.2 | 7.5 | 8.0 | Average pellet diameter after balling for each time. |
| 8 minutes | 6.0 | 8.0 | 8.0 | 9.4 | 10.2 | |
| 10 minutes | 7.2 | 9.0 | 9.8 | 10.0 | 11.0 | |
| Number of times knock test (height, 300 mm.) | 9.1 | 19.5 | 24.8 | 38.5 | 56.3 | |
| Crushing strength: | | | | | | |
| Kg./pellet | 0.75 | 0.80 | 1.0 | 1.2 | 1.3 | Average value of each 5 pieces of 11–14 mm.$\phi$ pellets. |
| Kg./cm.$^2$ | 0.58 | 0.60 | 0.74 | 0.91 | 0.99 | |
| Broken by rapid heat, percent | 0 | 0 | 0 | 0 | 0 | Rapid heat in furnace, 1,000° C. |
| Dried pellets: | | | | | | |
| Specific gravity: | | | | | | |
| Apparent s.g., g./cm.$^3$ | 2.04 | 2.34 | 2.33 | 2.41 | 2.43 | Dried in air bath for 10 hrs., 100° C. |
| Bulk density | 1.23 | 1.40 | 1.40 | 1.45 | 1.46 | |
| Crushing strength: | | | | | | |
| Kg./pellet | 3.14 | 4.78 | 6.83 | 7.97 | 11.23 | Average value of each 5 pieces of 16–18 mm.$\phi$ pellets. |
| Kg./cm.$^2$ | 1.47 | 2.41 | 3.27 | 3.59 | 4.12 | |
| Baked pellets: | | | | | | |
| Specific gravity: | | | | | | |
| Apparent s.g., g./cm.$^3$ | 2.34 | 2.70 | 2.70 | 2.86 | 2.89 | Baked in muffle furnace 2 hrs., 1,150° C. |
| Bulk density | 1.41 | 1.62 | 1.62 | 1.72 | 1.74 | |
| Crushing strength: | | | | | | |
| Kg./pellet | 77.5 | 106.3 | 130.0 | 156.0 | 173.0 | Average value of each 5 pieces of 15–17 mm.$\phi$ pellets. |
| Kg./cm.$^2$ | 36.7 | 50.4 | 67.4 | 71.2 | 96.7 | |

The result of experiments shows that damp raw materials of relatively fine pyrite cinders and other iron ores, comprising about 55% of minus 325 mesh particles, are capable of being continuously treated in a rod mill without choking. In addition when the raw materials are ground and pulverized so as to comprise approximately 70% of minus 325 mesh particles and simultaneously sufficiently mixed, kneaded, etc., resulted in increasing the bulk density of the material to be balled and the water content required for balling was lowered from 22.8% to about 17.5%. Stronger and more densely packed green pellets, of which the knocking resistance is increased from 9 to 50 times and the crushing strength increased from about 0.6 kg./cm.$^2$ to about 1.0 kg./cm.$^2$ at test pellet size, can thus be obtained at a rapid balling rate. These green pellets have practically enough resistibility to rapid drying and baking. And a remarkably excellent grade of pellets, of which the apparent specific gravity is increased from about 2.3 to about 2.9 and crushing strength increased from 37 kg./cm.$^2$ to 97 kg./cm.$^2$, can be prepared by baking them at 1,150° C.

In the present experimental data, it should be noted that although the raw materials have been pulverized to some extent by rod mill treatment, the improvement of the balling characteristics is considerably marked. In fact, this is one of the excellent characteristics of a damp grinding process for agglomeration according to this invention. This advantage might lie in that the raw materials which are ground and simultaneously strongly and sufficiently mixed, kneaded, etc., can be agglomerated in situ merely by the addition of a small amount of water, if necessary. These effects can never be achieved by either the usual wet or dry grinding process. Because, in either the wet or dry grinding process, effective pulverization and simple mixing can be performed, but strong mixing action or damp grinding action, which includes smearing, kneading, spatulating, etc. as well as improvement of agglomerating characteristics of the raw material, can not be expected. Such damp grinding action is considered to be caused not only by a bond due to simple capillary force but also by a stronger bond, due to intermolecular forces at the boundary between the solid and liquid and in liquid phase, by distributing water uniformly on the surface of the particles of raw material in very thin film and by minimizing the clearance between grains, such effects being able to be achieved only by treating materials in a damp state. In other words, one of the reasons why grinding and kneading of damp materials have not been taken into consideration for ths purpose may be because particular grinders should be used and the degree or efficiency of pulverization would be significantly decreased, if even possible. However, in the case of agglomeration, the important actions of mixing and kneading, etc., which can not be achieved by other processes, can be obtained by the damp grinding method with remarkable effects.

Either the wet or dry process for agglomeration requires the provision of an additional mixing or kneading device before pelletizing, especially in order to achieve above-mentioned effects. Therefore, in these processes, the equipment, steps and operations become complicated and, moreover, such drastic mixing effects as obtained in accordance with the present process simultaneously conducted with grinding can not be expected.

II. EXAMPLES OF RESULTS OBTAINED IN A PRACTICAL AND INDUSTRIAL OPERATION

Better results than those obtained in the laboratory experiments can be expected in industrial operations, because the action of the damp grinding machine, such as a rod mill or the like, as well as the balling action of the agglomerator, should be stronger and more effective.

In the industrial setting damp grinding was practiced successfully even in a special ball mill of the peripheral discharge type, and the results were much better than those obtained when rods were being charged.

The industrial equipment used in the present invention includes a shaft type sintering furnace of 153 m.³ inner volume exclusively fired by blast furnace gas, raw material bins, blending-, balling-, charging-, products discharging-, sieving- as well as transporting-devices, etc. This equipment manufactures pellets for iron making, from iron ores such as fine pyrite cinders of substantially the same quality as that described in preceding experiments. A damp grinding mill to be used for the present invention is additionally provided between the raw material blending step and the balling step in the plant.

In order to clearly show the effects obtained in practical operations divided into, (1) the first period-before the mill is equipped; (2) the second-after the rod mill is equipped; and (3) the third-after the mill is converted into the ball mill provided with a special device at the discharging portion, Table 2 is given hereinafter.

ly and industrially confirmed to be practicable, that the damp grinding or grinding in a damp state of fine iron pyrite cinder and other iron ores, which has not so far been attempted, is possible when a special rod mill, ball mill or the like is used. In addition this invention enables not only to grind and pulverize the raw material but also to simultaneously provide mixing and kneading action all in one step. Raw materials thus ground, mixed and kneaded, can be subjected directly to the agglomerating step, with addition of a small amount of water, if necessary. By combined effects of the above treatments, green pellets of high grade can be obtained very efficiently and economically at a high agglomerating rate with extremely simple equipment, steps and operation, compared with other well-known methods. As industrial raw materials are generally in a damp state, this process is particularly effective for their practical treatment.

The term "rod mill, ball mill and the like" as referred to above includes such mills having as a pulverizing medium not only metallic balls and rods but also mediums TABLE 2.—OPERATIONAL DATE IN THE PELLETIZING PLANT, BEFORE AND AFTER DAMP GRINDING MILL EQUIPPED

|  | Before mill equipped | After rod mill equipped | After converted into ball mill | Remarks |
| --- | --- | --- | --- | --- |
| Raw material directly before balling: |  |  |  |  |
| −325 mesh, percent | 55.1 | 61.7 | 68.7 | Wet sieving method. |
| Bulk density, g./cm.³ | 1.1 | 1.35 | 1.4 | Charged in 1 l. receptacle. |
| Green pellets: |  |  |  |  |
| Water content, percent | 18.2 | 14.5 | 14.1 |  |
| Crushing strength, kg./cm.² | 0.9 | 1.54 | 1.68 |  |
| Knock test resistance, percent | 30 | 57 | 75 | Percent of unbroken pellets after dropping twice from height of 1 meter. |
| Apparent s.g., g./cm.³ | 2.35 | 2.65 | 2.80 |  |
| Bulk density, g./cm.³ | 1.06 | 1.38 | 1.60 | Charged in 10 l. receptacle. |
| Baked pellets: |  |  |  |  |
| Average size, mm.φ | 21.0 | 18.5 | 16.0 |  |
| Tumbler index | 71.1 | 89.7 | 90.8 | Percent of pellets above 5 mm. after 200 revolutions (ASTM tumbler test). |
| Crushing strength, kg./cm.² | 49 | 113 | 117 |  |
| Shatter index +10 mm., percent | 92.9 | 96.9 | 97.8 | Percentage of pellets above 10 mm. after dropping from height of 2 meters 4 times. |
| Bulk density, g./cm.³ | 1.37 | 1.65 | 1.71 | Charged in 10 l. receptacle. |
| Result of operation output: |  |  |  |  |
| t./actual working day | 295 | 400 | 486 |  |
| Fuel gas consumption 10³, Kcal. | 540 | 300 | 150 |  |
| Dust occurrence rate, percent | 17.4 | 7.8 | 5.9 |  |

In Table 2, the effects of providing the ball mill are shown. Namely, the knock test resistance of the green pellets is increased to 2.5 times of that before the mill is equipped and to 1.3 times of that obtained in the case of the rod mill, showing a substantial improvement. And the crushing strength of the baked pellets, which affects the blast furnace operation, was found to be 2.4 times the value before the mill was equipped, and a somewhat better value was shown also against that of the rod mill. In reference, to the tumbler index of the baked pellets, a remarkable improvement was recognized.

Further, as to the output per actual working day and fuel gas consumption as seen in the column "Result of Operation," remarkable improvements have also been apparently realized.

When operational and maintenance costs of the ball mill is compared with those of the rod mill, the former is practically much more preferable as has been generally anticipated.

In the case of the ball mill, the choking phenomenon has been feared, but as results from actual operations, show it has been confirmed that raw materials hardly adhered to the inner wall of the mill. Even if such adherence may occur, it can be removed so easily that the operation can be continuously performed without any fear of choking.

In short, the process for agglomeration undergoing damp grinding in accordance with the present invention is based on the finding, which has been both experimentalof other shapes and of other materials, for instance the same ore as that to be treated. As to the lining of the inner surface of the mill, not only metals, such as steel, but other materials such as rubber may be used. When hard rubber is used for the lining, it can effectively prevent choking and may prolong the life of the lining owing to its high resistance to corrosion and abrasion.

The present invention is applicable not only to the above-mentioned iron ores, but also to all sorts of agglomeration, such as pelletizing and briquetting of other iron making raw materials, nonferrous ores, and other raw materials for the chemical, fuel, ceramic, cement and fertilizer industries, etc.

We claim:
1. A damp grinding process for the agglomeration of raw materials containing a liquid, said process comprising the steps of:
  (a) placing raw materials containing a liquid in a damp grinding mill having peripheral discharge openings and containing a pulverizing medium,
  (b) simultaneously grinding, mixing and kneading said raw materials in a damp state in said mill,
  (c) simultaneously controlling the liquid content of said raw materials during the grinding, mixing and kneading thereof, by adding liquid thereto in an amount sufficient to maintain the moisture content at a level of 7–18%,
  (d) transferring the ground, mixed and kneaded materials to an agglomerating machine, and

(e) agglomerating the materials in said agglomerating machine.

2. The process as claimed in claim 1 wherein the liquid added to said raw materials is water.

3. The process as claimed in claim 1 wherein the raw materials contain iron ores and non-ferrous ores.

4. The process as claimed in claim 1 wherein the raw materials contain a pyrite-cinder iron ore.

5. The process as claimed in claim 1 wherein the pulverizing medium is balls, rods or pebbles.

6. A damp grinding process for agglomerating a raw material selected from the group consisting of ferrous and non-ferrous ores, said process comprising placing said raw material dampened by a liquid contained therein in a damp grinding zone in the presence of a pulverizing medium, simultaneously grinding, mixing and kneading said dampened raw material in the damp grinding zone, maintaining the liquid content of said raw material in the damp grinding zone during the grinding, mixing and kneading thereof by adding liquid thereto in an amount sufficient to maintain the moisture in the raw material at a level of 7–18%, thereafter transferring the ground, mixed and kneaded raw material to an agglomerating zone and agglomerating the ground, mixed and kneaded raw material in the agglomerating zone.

References Cited

UNITED STATES PATENTS

| | | | |
|---|---|---|---|
| 1,457,161 | 5/1923 | Haire. | |
| 2,766,940 | 10/1956 | Weston | 241—21 |
| 3,254,985 | 6/1966 | Merklin | 75—3 |
| 3,314,780 | 4/1967 | Holowaty et al. | 75—3 |
| 3,338,705 | 8/1967 | Meyer et al. | 75—3 |

ANDREW R. JUHASZ, *Primary Examiner.*

F. T. YOST, *Assistant Examiner.*

U.S. Cl. X.R.

75—3